United States Patent
Hewitt et al.

(10) Patent No.: US 10,038,873 B2
(45) Date of Patent: Jul. 31, 2018

(54) ISOLATING TEMPORARY IMAGES

(71) Applicant: International Business Machines Corporation, Armonk, NY (US)

(72) Inventors: Trudy L. Hewitt, Cary, NC (US); Francesco C. Schembari, Durham, NC (US); Merrilee F. Tomlinson, Cary, NC (US); Christina L. Wetli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/398,261

(22) Filed: Jan. 4, 2017

(65) Prior Publication Data
US 2018/0191991 A1    Jul. 5, 2018

(51) Int. Cl.
*H04N 5/77* (2006.01)
*H04N 5/91* (2006.01)

(52) U.S. Cl.
CPC ............... *H04N 5/77* (2013.01); *H04N 5/91* (2013.01)

(58) Field of Classification Search
CPC .......... H04N 5/77; H04N 5/91; G06K 9/00456
See application file for complete search history.

(56) References Cited

U.S. PATENT DOCUMENTS

| | | | |
|---|---|---|---|
| 9,471,663 B1* | 10/2016 | Granstrom | G06F 17/30598 |
| 2009/0125570 A1 | 5/2009 | Bailey et al. | |
| 2016/0189008 A1* | 6/2016 | Zhang | G06K 9/00456 382/197 |

* cited by examiner

*Primary Examiner* — Nhan T Tran
(74) *Attorney, Agent, or Firm* — Yee & Associates, P.C.; Nicholas D. Bowman (57) ABSTRACT

A method for managing temporary images. The method comprises a computer system. The computer system identifies a context for an image for a user generating the image. The computer system determines whether the image is a temporary image based on the context of the image for the user. The computer system preforms a group of alternate actions on the image when the image is the temporary image.

20 Claims, 5 Drawing Sheets

ISOLATING TEMPORARY IMAGES

BACKGROUND

1. Field

The present disclosure relates generally to an improved computer system and more specifically to a method, apparatus, and computer program product for managing images. Still, more particularly, the present disclosure relates to a method, apparatus, and computer program product for managing temporary images generated using a device.

2. Description of the Related Art

Images, such as photographs, are generated using mobile devices, such as mobile phones and tablet computers. A user may take hundreds of photographs in a single day using a mobile phone. Some of these photographs may be temporary photos and are not intended to be retained on a permanent basis. For example, a user may take a photograph of a product that the user sees at a friend's house. The user may wish to buy the product at the store. After the user finds and purchases the product, the user no longer has a need for the photograph. The user may delete the photograph then or at a later time.

With the ease in which photographs can be taken using these types of devices, thousands of photographs may be present on a mobile device. The task of organizing and sorting through the photographs has become an increasingly arduous task. With the time and effort needed, a user may put off organizing and sorting the photographs, including those that are temporary photographs. As a result, the number of photographs stored on the mobile device continue to increase making organizing and sorting the photographs increasingly more time consuming and complex.

SUMMARY

An embodiment of the present disclosure provides a method for managing temporary images. The method comprises a computer system. The computer system identifies a context for an image for a user generating the image. The computer system determines whether the image is a temporary image based on the context of the image for the user. The computer system preforms a group of alternate actions on the image when the image is the temporary image.

Another embodiment of the present disclosure provides a computer system. The computer system comprises a processor unit and an image manager. The image manager runs on the processor unit, wherein the image manager identifies a context for an image for a user generating the image. The image manager determines whether the image is a temporary image based on the context of the image for the user. The image manager preforms a group of alternate actions on the image when the image is the temporary image.

Yet another embodiment of the present disclosure provides a computer program product. The computer program product comprises a computer-readable storage medium, a first program code, a second program code, and a third program code. The first program code is stored on the computer-readable storage medium, and identifies a context for an image for a user generating the image. The second program code is stored on the computer-readable storage medium, and determines whether the image is a temporary image based on the context of the image for the user. The third program code is stored on the computer-readable storage medium, and preforms a group of alternate actions on the image when the image is the temporary image, The features and functions can be achieved independently in the various embodiments of the present disclosure or may be combined in yet other embodiments, in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction processing device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of computer-readable storage medium includes the following: a portable computer diskette, a hard disk, a random access memory (RAM), a read-only memory (ROM), an erasable programmable read-only memory (EPROM or Flash memory drive), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing or processing devices from a computer-readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing or processing device receives computer-readable program instructions from the network and forwards the computer-readable program instructions for storage in a computer-readable storage medium within the respective computing or processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may run the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, or combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other devices implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, a segment, or a portion of instructions, which comprise one or more instructions for implementing the specified logical function or functions. In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, or combinations of blocks in the block diagrams and/or flowchart illustrations, can be implemented by special purpose hardware-based systems that perform the specified functions or acts or carry out combinations of special purpose hardware and computer instructions.

The illustrative examples provide a method, apparatus, and computer program product for managing temporary images. In one illustrative example, a computer system implements a method. A context is identified for an image for a user generating the image. A determination is made as to whether the image is a temporary image based on the context of the image for the user. A group of alternate actions is performed on the image when the image is a temporary image.

Figure 1:
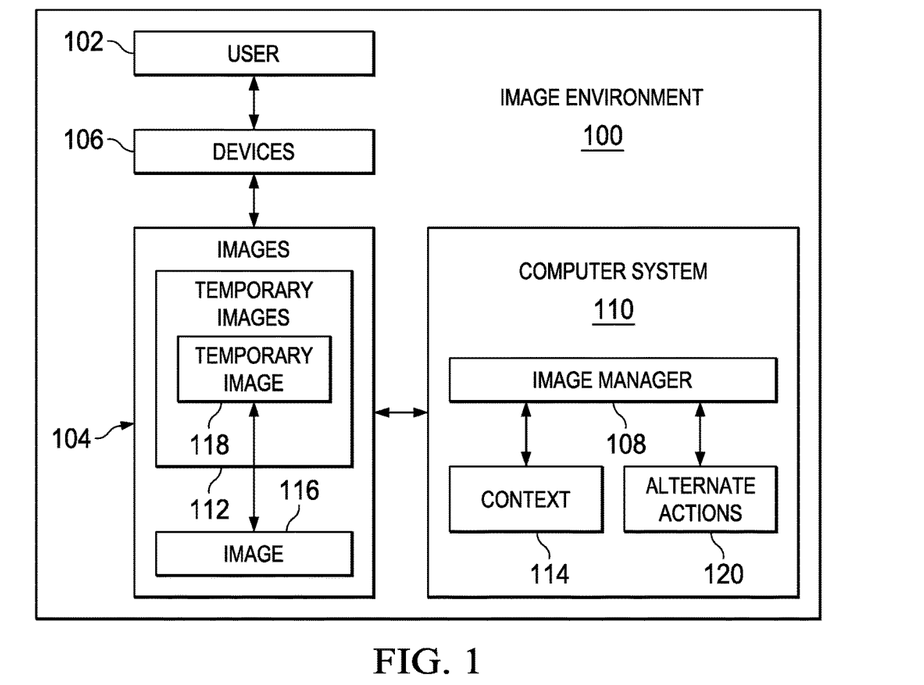
FIG. 1 is an illustration of an image environment in accordance with an illustrative embodiment.

With reference now to the figures and, in particular, with reference to FIG. 1, an illustration of an image environment is depicted in accordance with an illustrative embodiment. As depicted, image environment 100 is an environment in which user 102 may generate images 104 using devices 106.

Images 104 may take various forms in this example. For example, images 104 may be selected from at least one of a photograph, a video image, or some other type of image. When an image is a video image, the image may be located in a video.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combination of these items may be present. In some illustrative examples, "at least one of" may be, for example, without limitation, two of item A; one of item B; and ten of item C; four of item B and seven of item C; or other suitable combinations.

In this illustrative example, image manager 108 in computer system 110 operates to manage images 104. Computer system 110 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system. In one illustrative example, computer system 110 may be or may include devices 106.

Devices 106 may take a number of different forms. For example, devices 106 may be selected from one of a mobile device, a mobile phone, a tablet computer, a laptop computer, a digital camera, or some other type of device that generates images 104.

In the illustrative example, images 104 may be stored in a number of different locations. For example, images 104 may be stored in at least one of devices 106, computer system 110, a cloud storage, a network attached storage system, or some other suitable type of storage system or service As depicted, image manager 108 in computer system 110 operates to manage images 104. For example, image manager 108 may perform at least one of organizing or sorting images 104 generated by user 102 using devices 106. In one illustrative example, image manager 108 manages temporary images 112 that may be in images 104. For example, image manager 108 identifies context 114 for image 116 in images 104 for user 102 generating image 116. As depicted, context 114 is the circumstances relating to image 116. The circumstances may include for example, at least one of a purpose of image 116, an object within image 116, a location of user 102 when image 116 was generated, a calendar event for user 102 around the time when image 116 was generated, or other types of suitable information.

Image manager 108 determines whether image 116 is temporary image 118 based on context 114 of image 116 for user 102. Image manager 108 performs a group of alternate actions 120 on image 116 when image 116 is temporary image 118.

As used herein, a "group of" when used with reference items means one or more items. For example, a group of alternate actions 120 is one or more of alternate actions 120. An alternate action in alternate actions 120 is an action other than an action to store or retain image 116 for long-term storage. Long-term storage of image 116 means that user 102 tends to retain image 116 indefinitely and not based on some event.

Image manager 108 may be implemented in software, hardware, firmware or a combination thereof. When software is used, the operations performed by image manager 108 may be implemented in program code configured to run on hardware, such as a processor unit. When firmware is used, the operations performed by image manager 108 may be implemented in program code and data, and stored in a persistent memory to run on a processor unit. When hardware is employed, the hardware may include circuits that operate to perform the operations in image manager 108.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Programmable logic devices include, for example, a programmable logic array, a programmable array logic, a field programmable logic array, a field programmable gate array, and other suitable types of hardware devices. Additionally, the processes may be implemented in organic components integrated with inorganic components and may be comprised entirely of organic components, excluding a human being. For example, the processes may be implemented as circuits in organic semi conductors.

In one illustrative example, one or more technical solutions are present that overcome a technical problem with managing images 104 when images 104 number in the thousands. As a result, one or more technical solutions may provide a technical effect of reducing the time and effort needed by user 102 to sort and organize images 104. One or more technical solutions may be included as part of devices 106 when offered as a service through computer system 110 communicating with devices 106 for receiving images 104 from devices 106 for storage, management, or other processing.

As a result, computer system 110 operates as a special purpose computer system in which image manager 108 in computer system 110 enables managing images 104, and in particular, at least one of identifying or processing temporary images 112. In particular, image manager 108 transforms computer system 110 into a special purpose computer system as compared to currently available general computer systems that do not have image manager 108.

Figure 2:
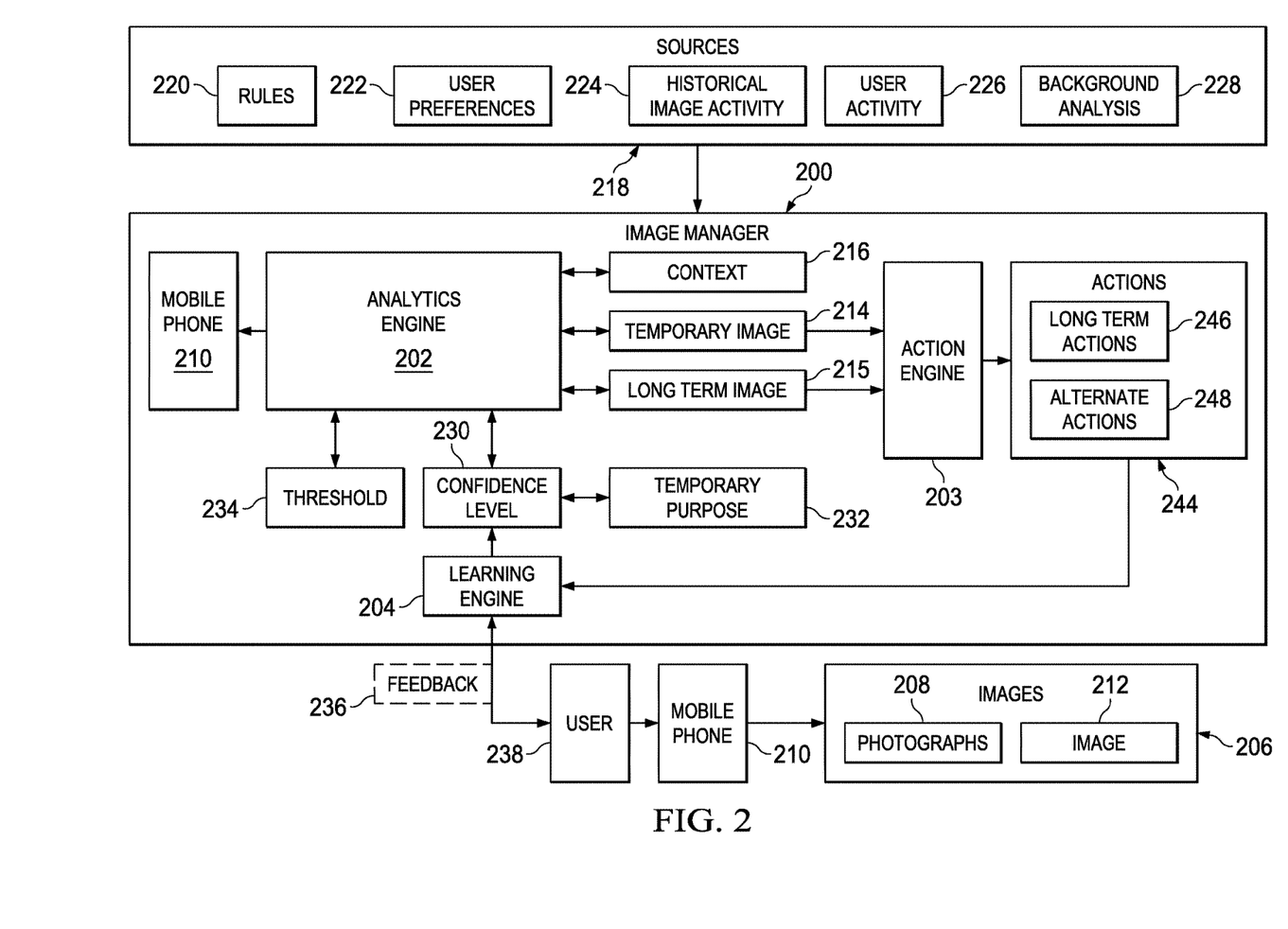
FIG. 2 is an illustration of an implementation for an image manager in accordance with illustrative embodiment.

With reference next to FIG. 2, an illustration of an implementation for an image manager is depicted in accordance with illustrative embodiment. In this example, image manager 200 is an example of one implementation for image manager 108 in FIG. 1.

Image manager 200 includes a number of different components. As depicted, image manager 200 includes analytics engine 202, action engine 203, and learning engine 204.

Analytics engine 202 may be implemented using a cognitive engine or other process that may monitor images 206 in the form of photographs 208 generated by mobile phone 210. Photographs 208 are an example of one type of image that may be present in images 104 in FIG. 1.

In this illustrative example, analytics engine 202 monitors for images 206 generated by mobile phone 210. Images 206 may remain on mobile phone 210 or may be sent to analytics engine 202 for processing and storage.

Analytics engine 202 determines whether image 212 in images 206 is temporary image 214 or long-term image 215. Analytics engine 202 identifies context 216 for image 212 using a group of sources 218. In this illustrative example, sources 218 include at least one of rules 220, user preferences 222, historical image activity 224, user activity 226, background analysis 228, or other suitable types of sources.

Rules 220 comprise rules selected for determining confidence level 230 for whether image 212 is temporary image 214. In other words, confidence level 230 provides an idea of how likely it is that image 212 is temporary image 214. User preferences 222 identify preferences for whether particular images are considered temporary images.

Historical image activity 224 identifies prior images that have been considered temporary images. Historical image activity 224 may be used for comparison to image 212 in determining confidence level 230 that image 212 is temporary image 214. User activity 226 identifies the current activity for user 102. User activity 226 may be identified through activity information such as social network posts, check-in at locations, a current location, a calendar entry, or other suitable types of information. Background analysis 228 includes information about the background for image 212. This information may be used to identify a location of where image 212 was taken or other circumstances that may be used to determine context 216 for image 212. In this manner, a determination may be made as to whether context to 216 has confidence level 230 for image 212 being temporary image 214.

For example, analytics engine may identify context 216 for image 212 using at least one of a location of where image 212 was taken, a presence of people in image 212, an absence of people in image 212, an identification of a first group of objects in the foreground, an identification of a second group of objects in the background, or some other suitable type of information relating to image 212.

Analytics engine 202 identifies confidence level 230 for context 216 of image 212. This confidence level may be used to determine whether image 212 is temporary image 214. Analytics engine 202 identifies image 212 as temporary image 214 based on confidence level 230 of context 216 of image 212 for the user is for temporary purpose 232, and when confidence level 230 is greater than threshold 234. The threshold is a value selected that indicates that confidence level 230 is reliable for determining that image 212 is for use temporary purpose 232.

In this illustrative example, action engine 203 performs a group of actions 244 based on the identification of whether image 212 is temporary image 214 or long-term image 215. When image 212 is long-term image 215, a group of long term actions 246 are performed. For example, a group of actions 244 comprises placing long-term image 215 into long-term storage. The long-term storage may be located in mobile phone 210, a photo stream, cloud storage, or some other suitable type of storage location. When image 212 is temporary image 214, action engine 203 may perform alternate actions 248 in actions 244.

Temporary image 214 is an image that has a short-term purpose, in contrast to long-term image 215. The purpose may be a specific purpose. For example, the purpose may be to provide an example of a product that is to be purchased. After the product has been purchased, temporary image 214 is no longer needed. The purchase of the product is an expiration event. In another example, temporary image 214 shows a price, a serial number, or some other information for the product.

In contrast, long-term image 215 is an image that is intended to be kept on a more permanent basis. For example, long-term image 215 may be a true photograph, such as one made for family trips, events, or other purposes that are intended to be kept.

In this manner, image manager 200 provides a mechanism to isolate and determine confidence level 230 for whether an image is needed for a short-term purpose, such as temporary image 214, or a long-term purpose, such as long-term image 215. Image manager 200 reduces the time and effort that user 238 needs to manage images 206 generated using mobile phone 210.

In this illustrative example, learning engine 204 may be used to increase confidence level 230 for future images based on feedback 236 from user 238. Learning engine 204 may identify a group of alternate actions 248. The group of alternate actions 248 is selected from at least one of deleting the image after a need for the image is no longer present, storing the image in a temporary storage, moving the image to a temporary photo stream, identifying an expiration date for the image, identifying an expiration event, or some other suitable type of action. As another example, the group of alternate actions 248 may include not backing up the image, backing up the image at a lower resolution, moving the image to a cloud temporary folder that is available for images to be restored for a certain length of time, or some other suitable type of alternate action.

Further, action engine 203 may delete temporary image 214 after an occurrence of an expiration event. The expiration event may be selected from at least one of a passage of a selected amount of time since the image was stored, a fulfillment of a purpose of the image, or some other suitable type of event.

The illustration of image environment 100 in FIG. 1 and image manager 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, images 206 may take forms other than photographs 208. For example, images 206 may be images in a video. As a result, videos may be managed in the same manner as photographs 208. As another example, types of devices other than mobile phone 210 may be used with image manager 200. For example, a tablet computer, a digital camera, or another suitable type of device also may be used with image manager 200. Further, image manager 200 may be used to manage images from one or more devices, in addition to or in place of mobile phone 210.

Figure 3:
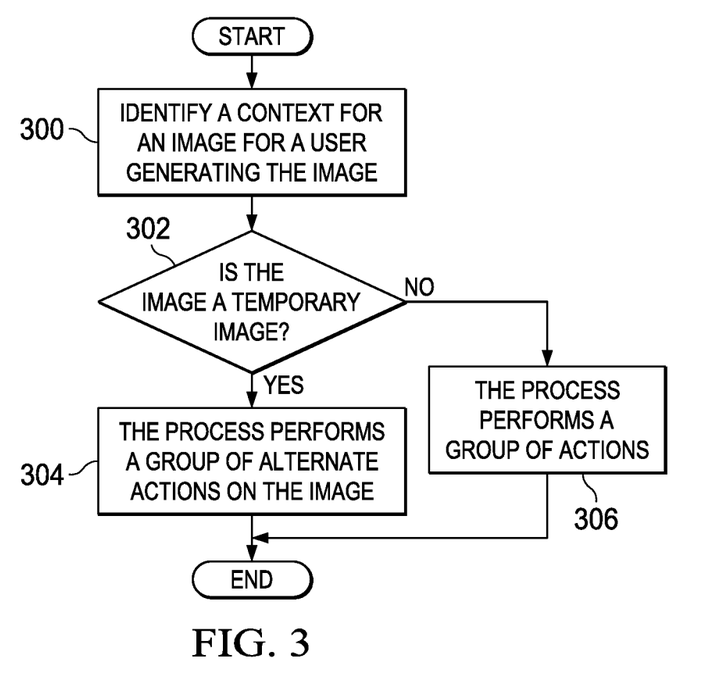
FIG. 3 is a flowchart of a process for managing temporary images in accordance with an illustrative embodiment.

Turning next to FIG. 3, a flowchart of a process for managing temporary images is depicted in accordance with an illustrative embodiment. The process illustrated in FIG. 3 may be implemented in image manager 108 in FIG. 1 or image manager 200 in FIG. 2. The process in this flowchart may take the form of a program code that runs on devices 106 in FIG. 1, mobile phone 210 in FIG. 2, computer system 110 in FIG. 1, or in some other device.

The process begins by identifying a context for an image for a user generating the image (step 300). The process determines whether the image is a temporary image based on the context of the image for a user (step 302). If a determination is made that the image is a temporary image, the process performs a group of alternate actions on the image (step 304). The process terminates thereafter.

With reference again to step 302, if a determination is made that the image is not a temporary image, the process performs a group of actions (step 306). These actions are actions consistent with images that should be kept long-term. For example, the group of actions may be to place the image in a photo stream, store the image in a backup location, or perform other actions.

Figure 4:
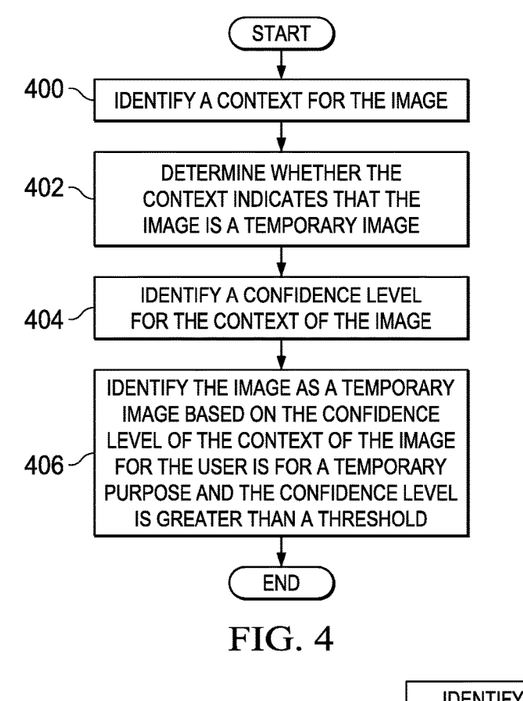
FIG. 4 is a flowchart of a process for determining whether an image is a temporary image in accordance with illustrative embodiment.

With reference now to FIG. 4, a flowchart of a process for determining whether an image is a temporary image is depicted in accordance with an illustrative embodiment. The process illustrated in FIG. 4 is an example of one implementation for step 302 in FIG. 3.

The process begins by identifying a context for the image (step 400). The process then determines whether the context indicates that the image is a temporary image (step 402). Step 402 is performed using rules in this illustrative example. The rules are applied to the context to determine whether the image is a temporary image or a long-term image.

The process identifies a confidence level for the context of the image (step 404). The process identifies the image as the temporary image based on the confidence level of the context of the image for the user is for a temporary purpose and the confidence level is greater than a threshold (step 406). The process terminates thereafter.

Figure 5:
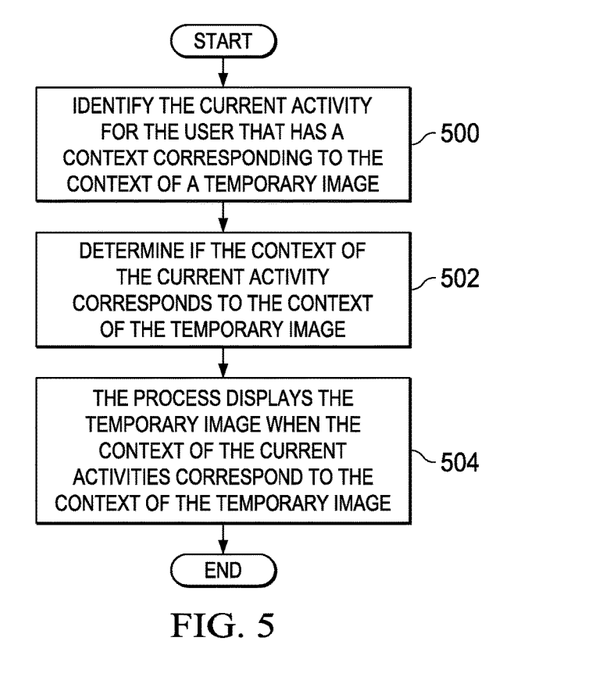
FIG. 5 is a flowchart of a process for displaying temporary images in accordance with illustrative embodiment.

Turning now to FIG. 5, a flowchart of a process for displaying temporary images is depicted in accordance with illustrative embodiment. The process illustrated in FIG. 5 may be implemented in image manager 108 in FIG. 1 or image manager 200 in FIG. 2. The process in this flowchart may take the form of a program code that runs on devices 106 in FIG. 1, mobile phone 210 in FIG. 2, computer system 110 in FIG. 1, or in another device.

The process begins by identifying the current activity of the user that has a context corresponding to the context of a temporary image (step 500). For example, if the user is browsing a website that sells washing machines, the context of the current activity may be washing machines. As another example, if the user is in a store that sells washing machines, then the context of the current activity also may be a washing machine.

A determination is made as to whether the context of the current activity corresponds to the context of the temporary image (step 502). For example, if the temporary image is a washing machine, the context of the temporary image is a washing machine. If the current activity of the user is browsing a website that sells washing machines, the context of this activity is shopping for a washing machine and corresponds to the context of the temporary image. As another example, the user may be in a store that sells washing machines. As a result, the current activity of the user shopping at the store is a context that corresponds to the context of the temporary image.

If the context of the current activity corresponds to the context of the temporary image, the process displays the temporary image when the context of the current activities corresponds to the context of the temporary image (step 504). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

In one example, a user and their spouse take photographs of washing machines, price tags, and other information. An image manager, such as image manager 108 in FIG. 1 or image manager 200 in FIG. 2, monitors photographs and identifies that the confidence ranking level of the photo is temporary based on a predefined threshold. In this illustrative example, monitoring may be passive. In other words, passive monitoring does not require actively requesting photographs for analysis.

In this example, the image manager removes the photographs from the device or photo library for the device and categorizes the photographs in a cloud temporary photo stream for "shopping". As depicted, the user is able to access the temporary photos by speaking or typing key words that are identifying tags for the photographs of the washing machine.

Further, the image manager also may dynamically display the photographs if it is determined that the user may need to view or access the photographs while on a website looking at washing machines, in a store that sells washing machines, or in some other suitable context. Further, the image manager may delete photographs that are no longer needed after the user purchases a washing machine.

The image manager may analyze the background of pictures to identify store locations or events. The image manager learns from user interaction when specific background images are historically identified as temporary.

In another illustrative example, a user takes a photograph of a serial number and a receipt. The image manager passively monitors photographs and identifies, using the confidence level, that the photo is temporary based on a predefined threshold.

The image manager identifies that the serial number matches the item purchased on the receipt and that a 2-year warranty is present for the product. In this case, the image manager removes the photograph from the device or photo library and categorizes the photos in a cloud temporary photo stream for "warranties." Further, the image manger may display the photograph if it is identified that the user may need to view or access the image. In this case, key words that have been entered or spoken may be used With this example, the image manager may delete the photograph when the photograph is no longer needed, such as when the warranty expires or based on some other expiration event.

Figure 6:
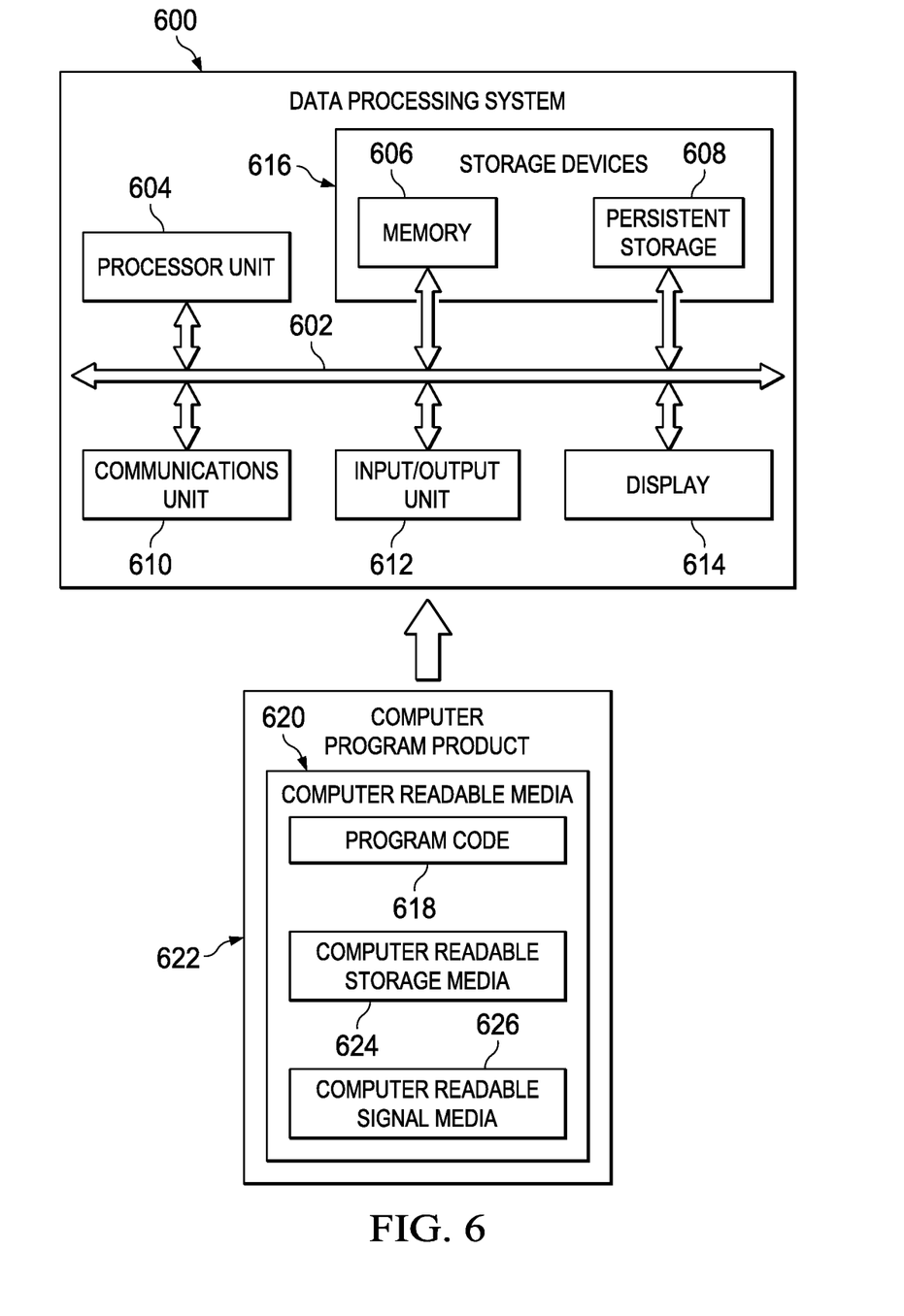
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system x100 may be used to implement computer system 110 and devices 106 in FIG. 1. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to process instructions for software that may be loaded into memory 606. Processor unit 604 may be a number of processors, a multi-processor core, or some other suitable type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable types of information either on a temporary basis, a permanent basis, or both on a temporary basis and a permanent basis. Storage devices 616 may also be referred to as computer-readable storage devices in these illustrative examples. In these examples, memory 606 may be, for example, a random access memory or any other suitable type of volatile or non-volatile storage device. Persistent storage 608 may take various forms, depending on the particular implementation.

For example, persistent storage 608 may contain one or more components or devices. For example, persistent storage 608 may be a hard drive, a solid state hard drive, a flash memory drive, a rewritable optical disk, a rewritable magnetic tape, or some combination of the foregoing. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable type of input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and run by a processor in processor unit 604. The program code in the different examples may be embodied on different physical or computer-readable storage media, such as memory 606 or persistent storage 608.

Program code 618 is located in a functional form on computer-readable media 620 that is selectively removable and may be loaded onto or transferred to data processing system 600 for processing by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer readable storage media 624 is a physical or tangible storage device used to store program code 618, rather than a medium that propagates or transmits program code 618.

Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cables, coaxial cables, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Thus, the illustrative embodiments of the present invention provide a computer implemented method, a computer system, and a computer program product for managing temporary images. In one illustrative example, a context for an image is identified for a user generating the image. A determination is made as to whether the image is a temporary image based on the context of the image for a user. A group of alternate actions are performed on the image when the image is a temporary image.

The descriptions of the various embodiments of the present invention have been presented for purpose of illustration, but are not intended to be exhaustive or limited to the embodiments disclosed. Many modifications and variations will be apparent to those of ordinary skill in the art without departing from the scope and spirit of the described embodiment. For example, image manager 108 of FIG. 1, may be extended to manage audio files in addition to or in place of images. The terminology used herein was chosen to best explain the principles of the embodiments, the practical application or technical improvement over technologies found in the marketplace, or to enable others of ordinary skill in the art to understand the embodiments disclosed herein.

The flowcharts and block diagrams in the figures illustrate the architecture, functionality, and operation of possible implementations of systems, methods and computer program products according to the various embodiments of the present invention. In this regard, each block in the flowcharts or block diagrams may represent a module, a segment, or a portion of code, which comprises one or more instructions for implementing the specified logical function or functions. It should also be noted that, in some alternative implementations, the functions noted in the blocks may occur out of the order noted in the figures. For example, two blocks shown in succession may, in fact, be performed substantially concurrently, or the blocks may sometimes be performed in the reverse order, depending upon the functionality involved. It should also be noted that each block of the block diagrams and/or flowchart illustrations, or combinations of blocks in the block diagrams and/or flowchart illustrations, can be implemented by special purpose hardware-based systems that perform the specified functions or acts, or combinations of special purpose hardware and computer instructions.

What is claimed is:

1. A method for managing temporary images, the method comprising:
   identifying, by a computer system, a context for an image for a user generating the image, wherein the context is circumstances relating to the image and used in determining whether the image is a temporary image;
   determining, by the computer system, whether the image is the temporary image based on the context of the image for the user; and
   performing, by the computer system, a group of alternate actions on the image when the image is determined to be the temporary image based on the context of the image, wherein identifying, by the computer system, the context for the image comprises:
identifying, by the computer system, the context for the image using at least two of a location of wherein the image was taken, a presences of people in the image, an absence of people in the image, an identification of a first group of objects in a foreground, and an identification of a second group of objects in a background.

2. The method of claim 1, wherein determining whether the image is the temporary image based on the context of the image for the user comprises:
identifying, by the computer system, a confidence level for the context of the image, wherein the confidence level is a level of confidence of whether the image is needed for short-term purposes or long-term purposes; and
identifying, by the computer system, the image as the temporary image based on the confidence level of the context of the image for the user is for a temporary purpose and the confidence level is greater than a threshold, wherein the circumstances relating to the image includes a purpose of the image, an object within the image, and a location of the user when the image was generated.

3. The method of claim 2 wherein the confidence level and the context of the image are identified using at least one of rules, user preferences, historical image activity, user activity, or background analysis.

4. The method of claim 2 further comprising:
increasing, by the computer system, the confidence level for future images based on a feedback from the user, wherein the confidence level is a level of confidence as to whether the image is needed for short-term purposes or long-term purposes.

5. The method of claim 1, wherein the group of alternate actions are selected from at least one of deleting the image after a need for the image is no longer present, storing the image in a temporary storage, moving the image to a temporary photo stream, identifying an expiration date for the image, or identifying an expiration event.

6. The method of claim 1, wherein performing, by the computer system, the group of alternate actions on image when the image is the temporary image comprises:
deleting, by the computer system, the temporary image after an occurrence of an expiration event, wherein the expiration event is selected from at least one of a passage of a selected amount of time since the image was stored or a fulfillment of a purpose of the image.

7. The method of claim 1, further comprising:
identifying, by the computer system, a current activity of the user;
determining if a context of the current activity of the user corresponds to the context of the image; and
displaying, responsive to determining that the context of the current activity of the user corresponds to the context of the image, the image.

8. The method of claim 1, wherein the temporary images are selected at least one of from a photograph or a video image.

9. A computer system comprising:
a processor unit; and
an image manager running on the processor unit, wherein the image manager identifies a context for an image for a user generating the image, wherein the context is circumstances relating to the image and used in determining whether the image is a temporary image; determines whether the image is the temporary image based on the context of the image for the user; and performs a group of alternate actions on the image when the image is determined to be the temporary image based on the context of the image, wherein identifying the context for the image comprises identifying the context for the image using at least two of a location of wherein the image was taken, a presences of people in the image, an absence of people in the image, an identification of a first group of objects in a foreground, and an identification of a second group of objects in a background.

10. The computer system of claim 9, wherein in determining whether the image is the temporary image, the image manager identifies a confidence level for the context of the image and identifies the image as the temporary image based on the confidence level of the context of the image for the user is for a temporary purpose and the confidence level is greater than a threshold, wherein the confidence level is a level of confidence of whether the image is needed for short-term purposes or long-term purposes, and wherein the circumstances relating to the image includes a purpose of the image, an object within the image, and a location of the user when the image was generated.

11. The computer system of claim 10 wherein the confidence level and the context of the image are identified using at least one of rules, user preferences, historical image activity, user activity, or background analysis.

12. The computer system of claim 10, wherein the image manager increases the confidence level for future images based on a feedback from the user, wherein the confidence level is a level of confidence as to whether the image is needed for short-term purposes or long-term purposes.

13. The computer system of claim 9, wherein the group of alternate actions is selected from at least one of deleting the image after a need for the image is no longer present, storing the image in a temporary storage, moving the image to a temporary photo stream, identifying an expiration date for the image, or identifying an expiration event.

14. The computer system of claim 9, wherein in performing the group of alternate actions on the image when the image is the temporary image, the image manager deletes the temporary image after an occurrence of an expiration event, wherein the expiration event is selected from at least one of a passage of a selected amount of time since the image was stored or a fulfillment of a purpose of the image.

15. The computer system of claim 9, wherein the image manager:
identifies a current activity of the user;
determines if a context of the current activity of the user corresponds to the context of the image; and
displays, responsive to determining that the context of the current activity of the user corresponds to the context of the image, the image.

16. The computer system of claim 9, wherein the temporary images are selected at least one of from a photograph or a video image.

17. A computer program product for managing images, the computer program product comprising:
a computer-readable storage medium;
a first program code, stored on the computer-readable storage medium, for identifying a context for an image for a user generating the image, wherein the context is circumstances relating to the image and used in determining whether the image is a temporary image;

a second program code, stored on the computer-readable storage medium, for determining whether the image is the temporary image based on the context of the image for the user; and a third program code, stored on the computer-readable storage medium, for performing a group of alternate actions on the image when the image is determined to be the temporary image based on the context of the image, wherein the first program code for identifying the context for the image comprises program code for identifying the context for the image using at least two of a location of wherein the image was taken, a presences of people in the image, an absence of people in the image, an identification of a first group of objects in a foreground, and an identification of a second group of objects in a background.

18. The computer program product of claim 17, wherein the determining step comprises:

identifying a confidence level for the context of the image, wherein the confidence level is a level of confidence of whether the image is needed for short-term purposes or long-term purposes; and identifying the image as the temporary image based on the confidence level of the context of the image for the user is for a temporary purpose and the confidence level is greater than a threshold, wherein the circumstances relating to the image includes a purpose of the image, an object within the image, and a location of the user when the image was generated.

19. The computer program product of claim 18 wherein the confidence level and the context of the image is identified using at least one of rules, user preferences, historical image activity, user activity, or background analysis.

20. The computer program product of claim 18 further comprising:

a fourth program code, stored on the computer-readable storage medium, for increasing the confidence level for future images based on a feedback from the user, wherein the confidence level is a level of confidence as to whether the image is needed for short-term purposes or long-term purposes.

* * * * *